United States Patent [19]
Kaufman

[11] 3,970,353
[45] July 20, 1976

[54] LOCKING CLIP

[75] Inventor: John Wilson Kaufman, Hershey, Pa.

[73] Assignee: AMP Incorporated, Harrisburg, Pa.

[22] Filed: Aug. 29, 1974

[21] Appl. No.: 501,942

[52] U.S. Cl. .......................... 339/75 MP; 339/91 R; 339/176 MP
[51] Int. Cl.² ........................................ H01R 13/54
[58] Field of Search ............ 339/91 R, 17 L, 17 LC, 339/17 LM, 75 MP, 176 MP, 217 S, 220 R

[56] References Cited
UNITED STATES PATENTS

| | | |
|---|---|---|
| 2,819,858 | 1/1958 | Mittendorf ...................... 339/217 S |
| 3,368,182 | 2/1968 | Culver .............................. 339/91 R |
| 3,439,227 | 4/1969 | Gifford ............................. 339/91 R |
| 3,573,706 | 4/1971 | Haberlen .......................... 339/91 R |
| 3,596,234 | 7/1971 | Sapienza .......................... 339/217 S |
| 3,731,252 | 5/1973 | McKeown et al. ............... 339/75 MP |

Primary Examiner—Roy Lake
Assistant Examiner—Neil Abrams
Attorney, Agent, or Firm—Russell J. Egan

[57] ABSTRACT

A locking clip is disclosed for use in combination with a known edge board connector to lock a printed circuit board in the connector. The locking clip incudes a body portion having a pair of resilient cantilever legs extending therefrom in parallel spaced relation. Each leg includes locking tine on the free end thereof directed inwardly toward the opposite leg and an outwardly directed locking lance intermediate the body and the free ends of each leg. At least one pair of opposed, spaced-apart contacts are removed from a conventional zero or low insertion force edge board connector housing and replaced by the subject locking clip. The locking tines of the clip engage in opposite sides of an aperture in the printed circuit board aligned with at least one pad thereof to secure the board in the connector. The subject locking clip permits the connector to retain its low insertion force characteristics while preventing the board from working loose when subjected to vibration and other stresses.

2 Claims, 3 Drawing Figures

LOCKING CLIP

BACKGROUND OF THE INVENTION

1. Field Of The Invention

The present invention relates to a locking clip and in particular to a locking clip to be used as a replacement for at least a pair of contacts in a conventional low insertion force edge board connector to hold a circuit board in the connector without affecting the low wear characteristics thereof.

2. The Prior Art

There are many instances when it is desirable to have a low insertion force connector for making engagement with the edge of the printed circuit board. The primary reason for having such a connector is to protect the pads on the circit board from excessive wear. This is generally accomplished by one of several means including camming the housing apart and/or camming the contacts apart to allow insertion of the board between spaced rows of contacts without the contacts dragging across the pads. Examples of such connectors can be found in U.S. Pat. Nos. 3,594,699 and 3,710,303. While the connectors such as those described in the above mentioned patents do accomplish the goal of reducing wear on the pads of a printed circit board, they do not always sufficiently secure the board in the connector to prevent unintentional disengagement thereof. An example of such incidences would be an apparatus which would be subjected to excessive or high amounts of vibration. The connectors described in the above mentioned patents do serve to lock the board in place but the connectors themselves are rather complex and expensive to produce. Also, since there are a great number of moving parts, there is always the problem of potential jamming or wear of the parts which would reduce the efficiency thereof.

Attempts have been made to provide a type of locking clip which could be used to secure a circuit board in a housing. Examples of this type of clip can be found in U.S. Pat. Nos. 3,278,714, and 3,439,227. Both of the clips disclosed in these patents have the disadvantage that they are not suitable for replacing contacts in an existing housing but must be used with a particular type of housing and a particular type of printed circuit board.

Other known contacts have been proposed which will serve in cooperation with a camming device in an edge board connector to lockingly secure a circit board in a connector. Both of these contacts have portions which engage through holes in the circuit board thereby electrically and mechanically locking the board in the connector.

U.S. Pat. Nos. 3,207,536 and 3,368,182 both disclose axially operated coupling devices which are inserted into connector housings. The relative movement of the housing members with respect to one another accomplishes the locking by the axial movement of the coupling devices. Here again the device described is quite similar to the previously discussed prior art since cooperation between the connector members is necessary in order to effect the desired operation.

All of the above discussed prior art devices have the prime disadvantage in that they are useful only with a single type of connector and this connector is generally relatively expensive to produce since it involves a multiplicity of parts.

SUMMARY OF THE INVENTION

The present invention is embodied in a locking clip adapted to replace a pair of contacts in a known edge board connector, preferably of the zero or low insertion force type, to secure a printed circuit board therein while allowing the connector to retain its low insertion force characteristics. The subject locking clip includes a main body portion with a pair of cantilever arms extending therefrom in parallel spaced relationship. Each arm has a tine on the free end thereof directed towards the opposite arm and an outwardly directed locking shoulder intermediate the ends thereof. The key is made of a resilient material, such as a plastics material, and is used to replace a pair of conventional contacts normally positioned in a connector housing. The locking clip will secure a circuit board in the connector by the tines entering opposite sides of an aperture in the board, which aperture is aligned with a pad and spaced from the edge of the board.

It is therefore an object of the present invention to produce a locking clip to be used in combination with known edge board connectors, preferably of the zero or low insertion force type, to insure that printed circit boards inserted therein will be retained in the inserted position.

It is another object of the present invention to produce a locking clip which is readily interchangeable with a pair of known contacts in a known printed circuit board edge connector to secure a printed circuit board therein.

It is a further object of the present invention to produce a printed circuit board edge connector locking clip which can be readily and economically produced.

The means for accomplishing the foregoing objects and other advantages will become apparent from the following detailed description taken with reference to the accompanying drawings.

DETAILED DESCRIPTION OF THE PREFERRED EMBODIMENT

Figure 1:
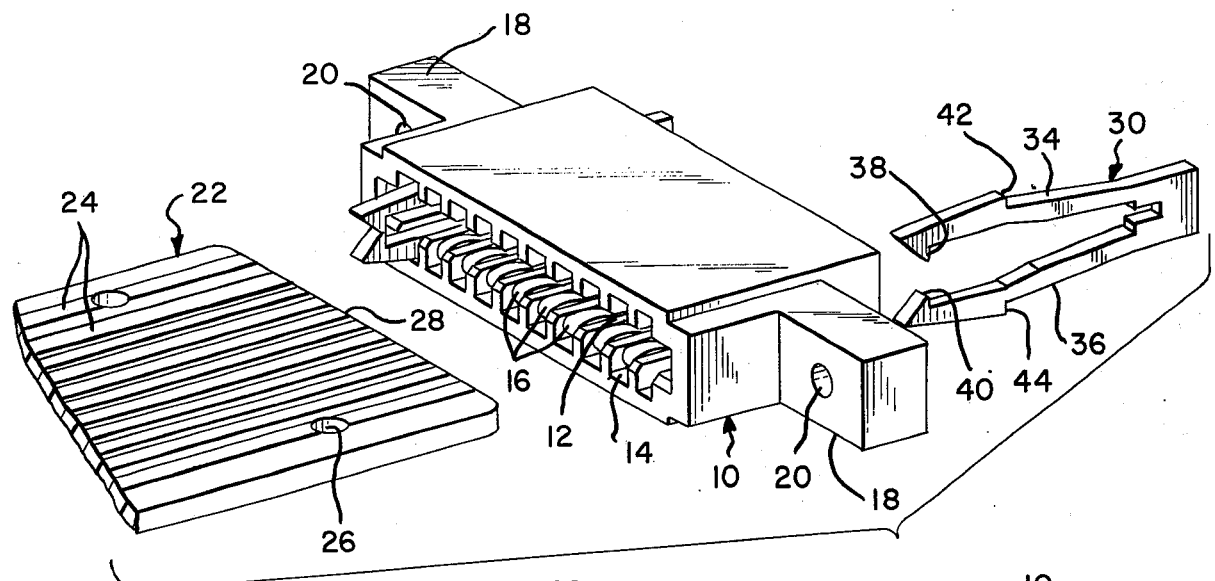
FIG. 1 is an exploded perspective view of the subject locking clip together with a known low insertion force edge board connector and a fragment of a printed circuit board.

A conventional low insertion force edge board connector housing 10 includes an elongated board receiving aperture 12 with a plurality of contact channels 14 in parallel spaced relation on opposite sides of the aperture 12. A plurality of contacts 16 are mounted in the respective channels 14. The connector housing also includes flanges 18 each provided with an aperture 20 for mounting the connector on an associated device, not shown. The related printed circuit board 22 has a plurality of edge pads 24 formed thereon by conventional means. At least one aperture 26 is formed in a pad spaced from the edge 28 of the board. The subject locking clip 30 includes a body portion 32 having first and second cantilever arms 34, 36 extending therefrom in generally parallel spaced relation. An inwardly directed tine 38, 40 is located on the free end of each arm and directed towards the opposite arm. A locking shoulder 42, 44 is formed on each arm 34, 36, respectively, intermediate the ends thereof.

The subject locking clip is shown replacing a pair of conventional contacts at the two end most positions of the connector. This is not to be construed as the only configuration for use of the locking clip since any number of pairs of contacts at any selected location can be removed and replaced by a locking clip. The locking clip is inserted into the empty contact channels 14 by hand or by automatic machinery until the locking shoulders 42, 44 engage in the steps of 46, 48 of the housing. The locking clip will be retained in the housing when the circuit board is pushed against the tines thereof by engagement of shoulders 42, 44 with steps 46, 48, respectively. It should be here noted that the arms of the locking clip are sufficiently flexible that the clip can be removed by gripping the body portion 32 with appropriate means, such as pliers, and exerting a force on the clip in the rearward direction.

Figure 2:
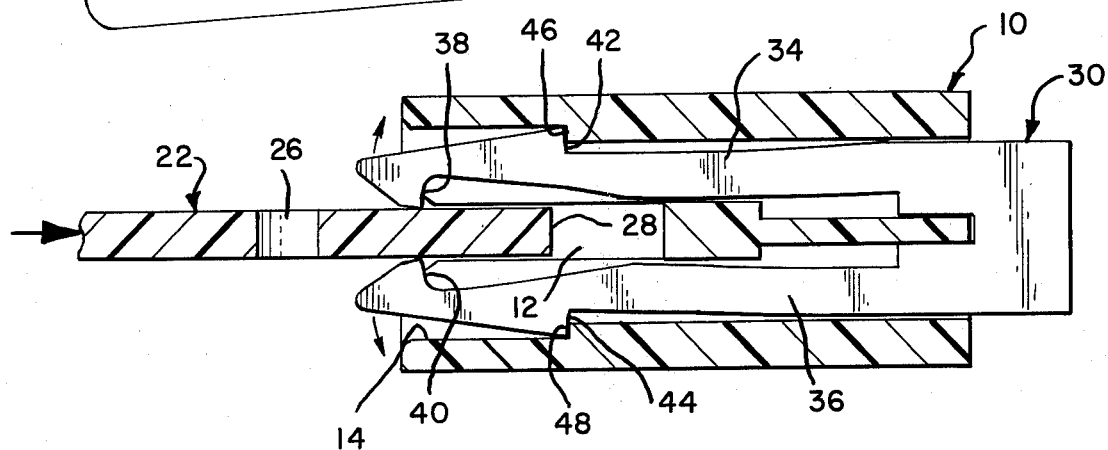
FIG. 2 is a vertical transverse section through the connector of FIG. 1 showing a locking clip according to the present invention mounted therein and with a printed circuit board partially inserted into the connector.
Figure 3:
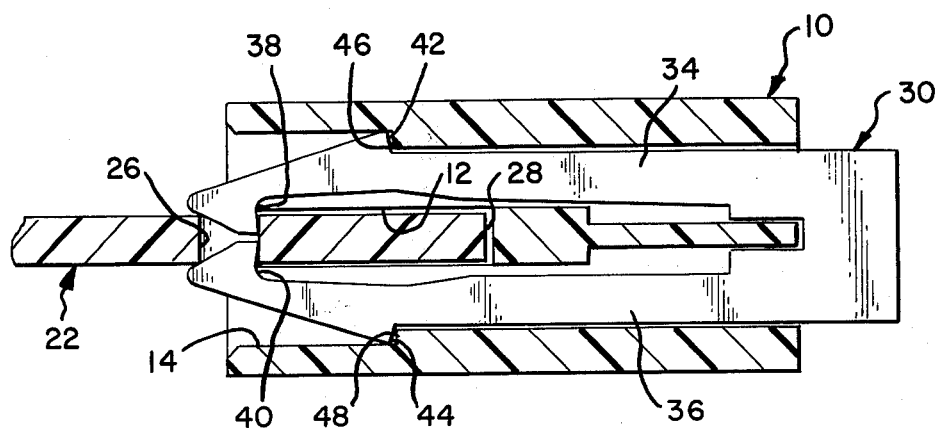
FIG. 3 is a section similar to FIG. 2 showing the printed circuit board fully inserted into the connector and engaged by the subject locking clip.

In the normal condition outside of a connector housing the cantilever arms of the locking clip diverge slightly from one another. When they are inserted into the housing, as shown in FIGS. 2 and 3, the cantilever arms are resiliently biased toward one another by the engagement of the shoulders 42, 44 with the respective steps 46, 48 so that the tines 38, 40 normally are in contact with one another forming a V-shaped entry as shown in FIG. 2.

The locking clip will receive the edge of the printed circuit board between the tines and be cammed open with the arms 34, 36 pivoting about their respective shoulders 42, 44. When the aperture 26 in the printed circuit board reaches the correct position, the tines 38, 40 will snap into the aperture to secure the printed circuit board in place as shown in FIG. 3.

It should be noted that while the subject locking clip has been described and shown initially positioned in a connector housing, it is also possible to utilize the subject device by first inserting a printed circuit board into the connector, after having first removed appropriate pairs of contacts, and subsequently locking the board in place by inserting the locking clip into the connector housing.

The present invention may be subject to many changes and modifications without departing from the spirit or essential characteristics thereof. The present embodiment is therefore intended in all respects as being illustrative and not restrictive.

I claim:

1. In combination with an edge board connector for printed circuit boards and the like, a locking clip substituted for a pair of contacts in said connector to secure a printed circuit board therein, said clip comprising:
   a body portion,
   a pair of spaced cantilever arms extending integrally from one side of said body portion, said arms having a normally diverging configuration outside said connector and being biased to a substantially parallel configuration inside said connector,
   a tine on the free end of each said arm directed inwardly towards the other of said arms, each said tine having an inclined surface directed toward the free end of said arms and a sharp shoulder directed toward said body;
   a locking shoulder projecting outwardly from each said arm intermediate the ends thereof, said shoulders engaging said connector to bias said arms to their parallel configuration and providing a fulcrum about which said arms pivot when a board is inserted therebetween, whereby said tines are biased for insertion into apertures in said printed circuit board to lock the board therein.

2. The locking clip according to claim 1 wherein said locking clip is a unitary member of resilient plastic material.

* * * * *